No. 854,983. PATENTED MAY 28, 1907.
R. V. CLARK.
MASSAGE MACHINE.
APPLICATION FILED AUG. 1, 1906.
2 SHEETS—SHEET 1.
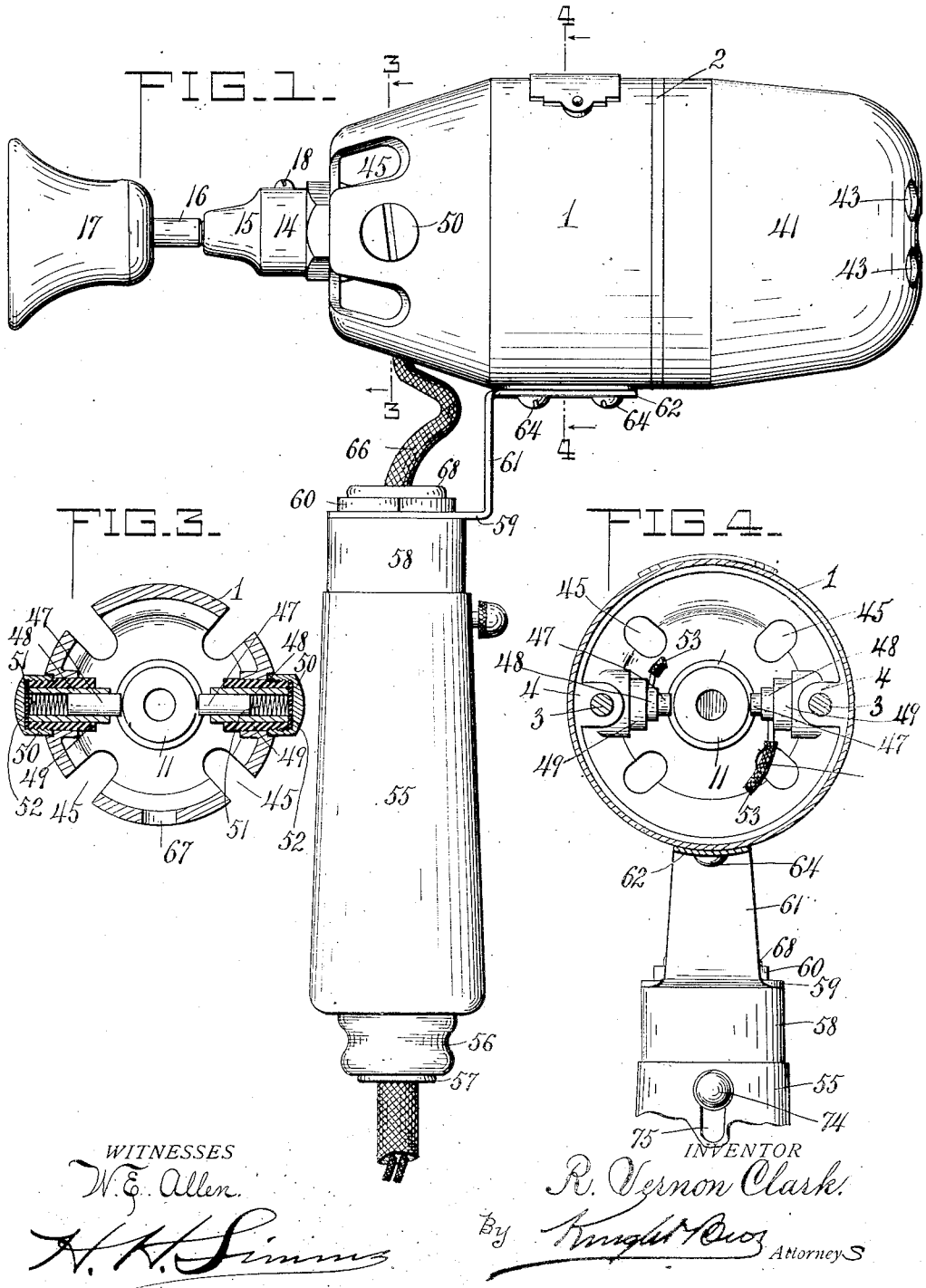
WITNESSES
W. E. Allen
H. H. Simms
INVENTOR
R. Vernon Clark
By Knight Bros
Attorneys

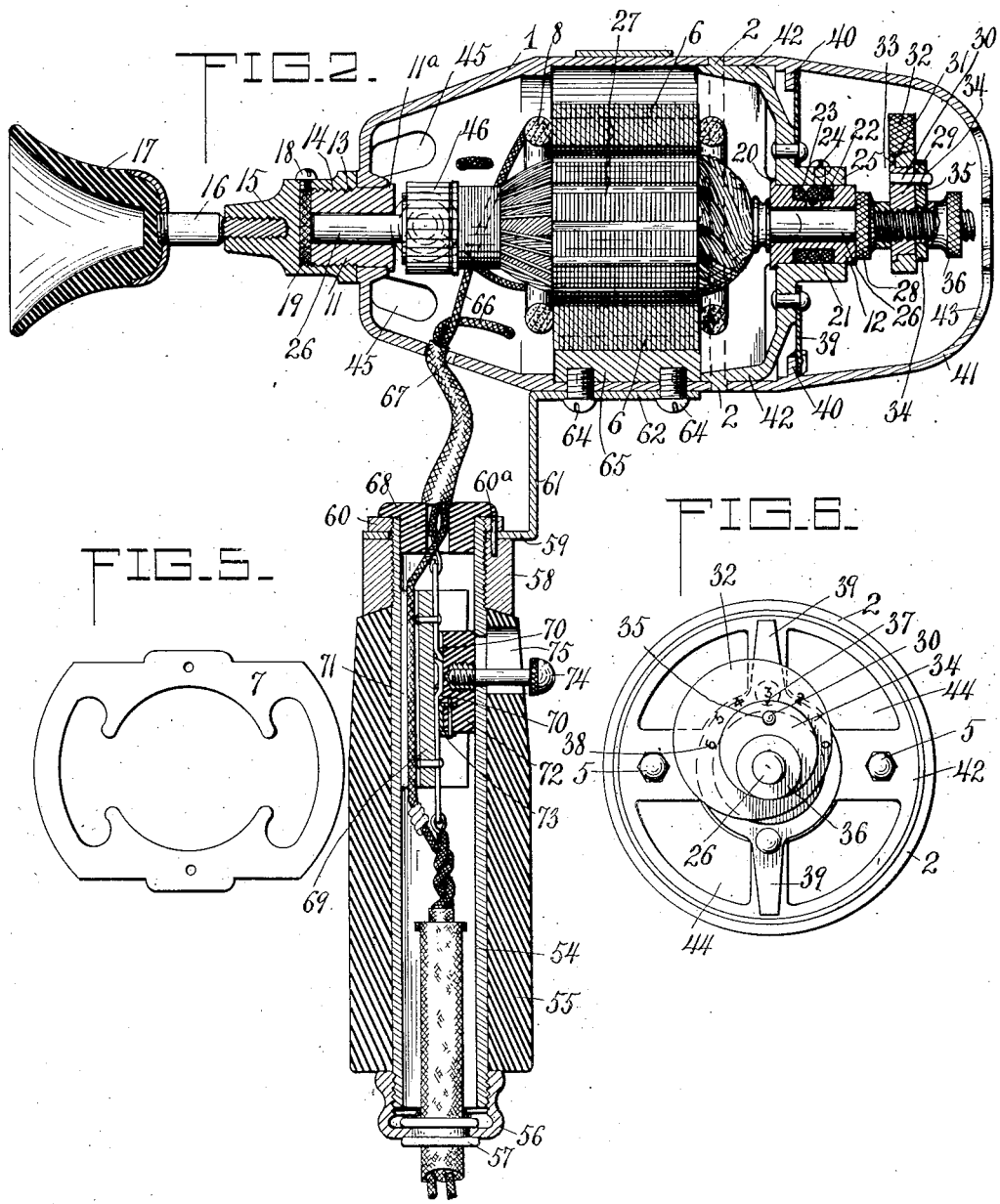

UNITED STATES PATENT OFFICE.

RICHARD VERNON CLARK, OF ST. LOUIS, MISSOURI.

MASSAGE-MACHINE.

No. 854,983.  Specification of Letters Patent.  Patented May 28, 1907.

Application filed August 1, 1906. Serial No. 328,770.

*To all whom it may concern:*

Be it known that I, RICHARD VERNON CLARK, a citizen of the United States, and a resident of St. Louis, in the State of Missouri, have invented certain new and useful Improvements in Massage-Machines, of which the following is a specification.

This invention relates to massage machines and it has for an object to improve the construction of that type of massage machine in which the massage member is rigidly connected to the motor frame or support and means is provided for inducing vibration in said motor frame or support.

Other and further objects will appear in the following description and will be more particularly pointed out in the appended claims.

In the drawings: Figure 1 is a side elevation of a massage machine made in accordance with my present invention; Fig. 2 is a central sectional view of the machine, parts being shown in elevation; Fig. 3 is a section on line 3—3, Fig. 1; Fig. 4 is a section on line 4—4, Fig. 1; Fig. 5 is a detail view of one of the plates forming the field magnets; and Fig. 6 is an end view of the motor frame with the protecting cap removed.

The motor casing comprises two members 1 and 2 made of aluminium. The two members are held together by tie rods 3 which are anchored at one end in internal bosses 4 near the front end of the member 1 and pass at their other ends through openings in the member 2, being held at these latter ends by nuts 5.

Within the casing member 1 are positioned the field magnets 6 which are formed of a number of plates 7 (one being shown in detail in Fig. 5) and are within the field 8.

As the casing or frame of the motor is made of aluminium, it is impracticable to journal the shaft of the armature therein and for this reason bearing pieces 11 and 12, made of brass or other suitable material, are provided. The bearing piece 11 is formed with a flange 11$^a$ at one end, which flange bears against the inner wall of the casing member 1. The other end of the bearing piece projects through the wall to the exterior of the casing, the projecting portion being provided with external threads 13. On this threaded projecting portion is fitted a massage-member-securing-device which is provided with an enlarged internally threaded socket portion 14 engaging the threads 13 and abutting the outer wall of the casing member 1, whereby the bearing 11 is held securely to the casing member. The massage-member-securing-device is also provided with a smaller internally threaded socket portion 15 to receive the shank 16 of a massage member 17 of any suitable form. A screw plug 18 fits into an opening which leads into a lubricant space at the rear end of the socket portion 14, said lubricant space being filled by a packing 19 which feeds the lubricant to the bearing. The other bearing piece 12 is provided with an annular flange 20 which bears against the inner wall of the casing member 2. This bearing piece is also provided with an external annular groove 21 having a port 22 leading to the bearing. Within the groove is located a lubricant packing 23 to which the lubricant is fed through a plugged opening 24 in an annular flange 25 on the member 2 and surrounding the bearing piece 12.

An armature shaft 26, having an armature 27, is journaled in bearing pieces 11 and 12, and carries on the end that projects from the bearing 12 on the outside of the casing member 2, a device for inducing vibration in the frame or casing of the motor. For this purpose, the projecting end of the shaft is screw threaded and carries a nut 28 which acts to limit the end thrust of the shaft and at the same time limits the inward movement of an eccentric disk 29 which is also screwed onto the shaft. This eccentric disk carries a projection 30 extending parallel to the axis of the shaft and an annular peripheral flange 31. A second eccentric disk 32 fits on the periphery of disk 29 and is provided on one side with a groove 33 in which fits the annular flange 31 of disk 29. A third and clamping disk 34 is fitted on the shaft 26 on the side of the disk 32 opposite the flange 31. This third disk has a diameter greater than the periphery of the disk 29 so as to clamp disk 32 between it and the flange 31. Disk 34 is provided with an opening 35 into which extends projection 30 to prevent relative turning between disks 29 and 34. To hold disk 32 clamped between disks 29 and 34, a jam nut 36 is provided on shaft 26 to engage the movable clamping disk 34.

It is apparent that when jam nut 36 is loosened, the disk 32 may be turned so as to assume either a position concentric with shaft 26 or a number of eccentric positions. The disk 34 carries a pointer or arrow 37 which is adapted to register with a number of marks 38 on disk 32 to indicate the amount of vibration.

To prevent the vibrator injuring any one during the operation of the machine, that end of the casing carrying the vibrator, is provided with a pair of spring fingers 39 which are engaged by beveled lugs 40 upon the interior of a cap 41 which fits upon a reduced portion 42 of the casing member 2.

The cap, casing member 2 and casing member 1 are provided with openings 43, 44 and 45 to provide for the ventilation of the motor to keep the motor cool.

The shaft 26, on the end opposite the vibrator and within the casing, is provided with a commutator 46. Bearing upon opposite sides of the commutator is a pair of brushes 47 which are mounted within brass sleeves 48 positioned within insulated sleeves 49. Insulated sleeves 49 are screwed into the casing and extend to the exterior thereof, where they are provided with screw caps 50 which, when removed, permit the brushes 47 to be renewed. The brushes are yieldingly held against the commutator by helical springs 51 which abut against insulated disks 52 within the caps 50. The brushes are connected to the field of the motor by conductors 53 which are located entirely within the casing, being in engagement with the brass sleeve 48.

The motor casing is supported by a handle which is yieldingly connected to the motor in a manner to be hereinafter described. The handle comprises a tubular metallic member 54, surrounded by a soft rubber sleeve 55 and provided with screw threads at each end. Upon the lower end of the tubular member is fitted a ferrule 56 having a central opening in which is fitted an insulating bushing 57 formed of soft rubber and provided with a peripheral groove so that it will be held to the ferrule. Upon the upper screw threaded end of the tubular member 54 is fitted an internally threaded collar 58. This collar forms one of the clamping members of the lower horizontal arm 59 of a Z-shaped bracket connecting the handle to the casing of the motor. This arm 59 is provided with an opening and is fitted about tubular member 54 so as to rest on collar 58, being held against said collar by a clamping nut 60. A pin 60ᵃ is passed through nut 60 and arm 59 into collar 58.

The vertical arm 61 of the Z-shaped bracket provides the yielding connection between the handle and the casing. The upper horizontal arms 62 is provided with bolt openings through which pass screw bolts 64 which engage a brass keeper 65. This keeper is provided to anchor the screw bolts, as the casing, being made of aluminium, will not form a sufficient anchorage.

The wires 66 from the field of the motor lead through an opening 67 in the casing to and through an insulated bushing 68 in the upper end of the tubular member 54.

Within the tubular member 54 is located the switch for controlling the motor. This switch comprises an insulated contact supporting member 69 having a pair of contacts 70 which are connected to one of the lead wires of the motor. The contact supporting member is also provided with a channel 71 through which passes the other lead wire, the two lead wires being surrounded by one insulation and passing through bushing 57 to any suitable source of electricity. To make and break the circuit, a movable switch member is provided. It comprises an insulated body 72 carrying a contact 73 to bridge contacts 70. This insulated body is moved by a finger piece 74 extending from said body through a slot 75 in tubular member 54 and rubber sleeve 55.

The operation of the invention is as follows: The vibrator is adjusted in the manner hereinbefore described to get the desired vibrations and the switch is then thrown on. As the armature revolves, the vibrator induces vibration in the motor casing and, as the massage member is rigid therewith, vibration is induced in said massage member.

Having thus described my invention, what I claim and desire to secure by Letters Patent is:

1. In a massage machine, the combination of the casing, a motor therein, a bearing for the shaft of the motor, engaging the inner face of the casing, and projecting through the casing to the outside thereof, and a massage member securing device engaging the projecting end of the bearing.

2. In a massage machine, the combination of the casing, a motor therein, and a motor shaft bearing, and a massage-member securing-device engaging respectively the inner and the outer walls of the casing and connected together.

3. In a massage machine, a casing a bearing engaging the inner wall thereof and provided with a threaded portion projecting to the outside of the casing, and a massage member securing device secured on the threaded projecting end of the bearing.

4. The combination of a motor casing, a motor therein having a shaft extending to the exterior of the casing, a massage member secured to the casing, means for inducing vibrations in the casing secured to that portion of the shaft extending to the exterior of the casing, and a removable cap secured to the casing and inclosing said means.

5. The combination with a casing, of a motor therein, a massage member secured to the casing, an eccentric disk secured to the motor shaft and provided with a peripheral flange and a projection extending in a direction parallel to the shaft, an eccentric disk turning on the periphery of the first disk, an eccentric clamping disk holding the second named disk in engagement with the flange on the first named disk, and a nut movable on the shaft to hold the clamping disk in place.

6. In a massage machine, an electric motor, a handle supporting the motor and provided with a central tube having a slot, lead wires extending through the tube, an insulated contact supporting member arranged within the tube having a channel through which one of the lead wires passes, and carrying a pair of contacts to which the other lead wire is connected, a sliding switch member within the tube adapted to bridge the contacts, and a finger piece extending through the slot.

7. In a massage machine, an electric motor, and a handle comprising a central tube provided with screw threaded ends, a rubber sleeve surrounding the tube, a ferrule at one end of the tube abutting one end of the sleeve, a collar at the other end of the tube abutting the other end of the rubber sleeve, a bracket surrounding the tube and connected with the motor, and a nut clamping the bracket against the collar.

The foregoing specification signed at St. Louis Missouri this 30th day of July, 1906.

RICHARD VERNON CLARK.

In presence of two witnesses—
   W. S. HELLER,
   RUBY JONES.